June 9, 1964 G. PERRET 3,136,133
LAYING DOWN OF IMMERSED PIPES
Filed Dec. 16, 1960 6 Sheets-Sheet 1
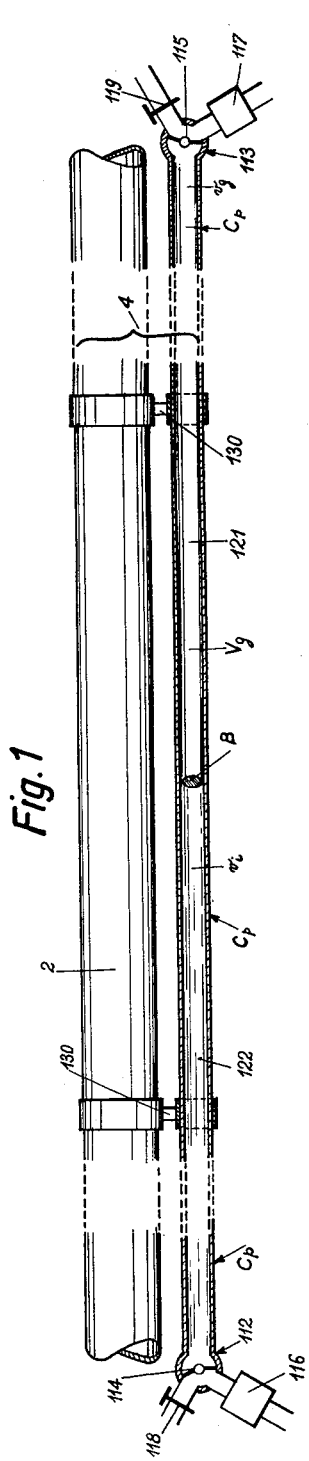
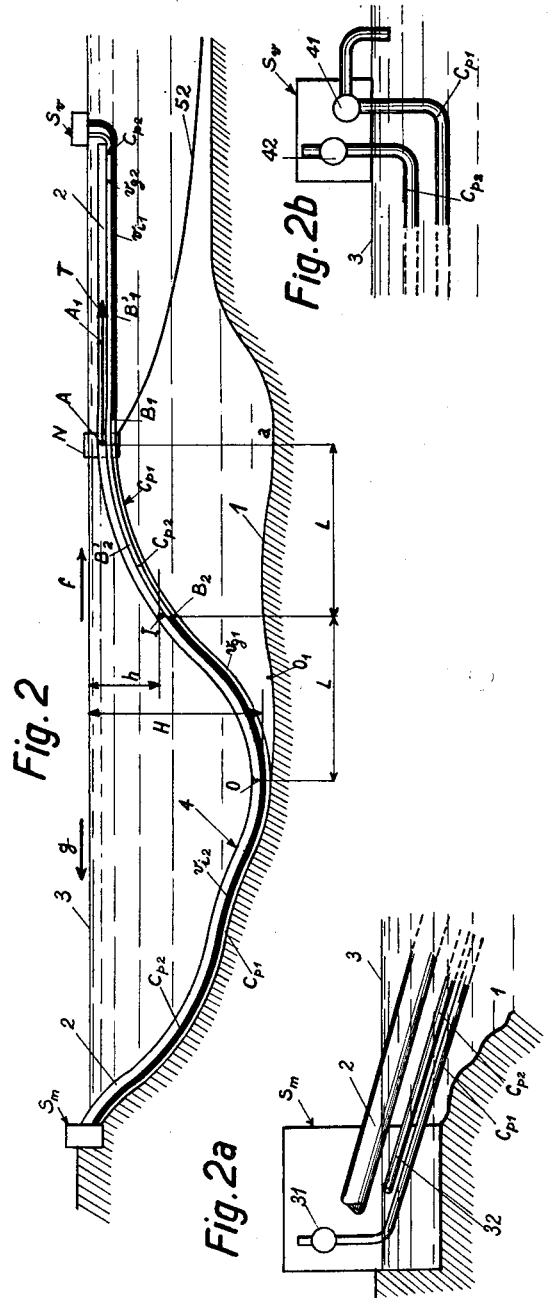
INVENTOR
GEORGES PERRET
By Irwin S. Thompson
ATTY.

June 9, 1964 G. PERRET 3,136,133
LAYING DOWN OF IMMERSED PIPES
Filed Dec. 16, 1960 6 Sheets-Sheet 2
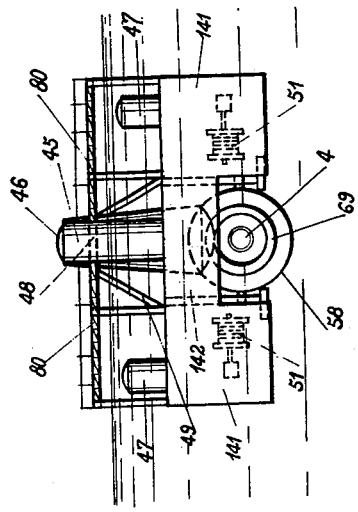
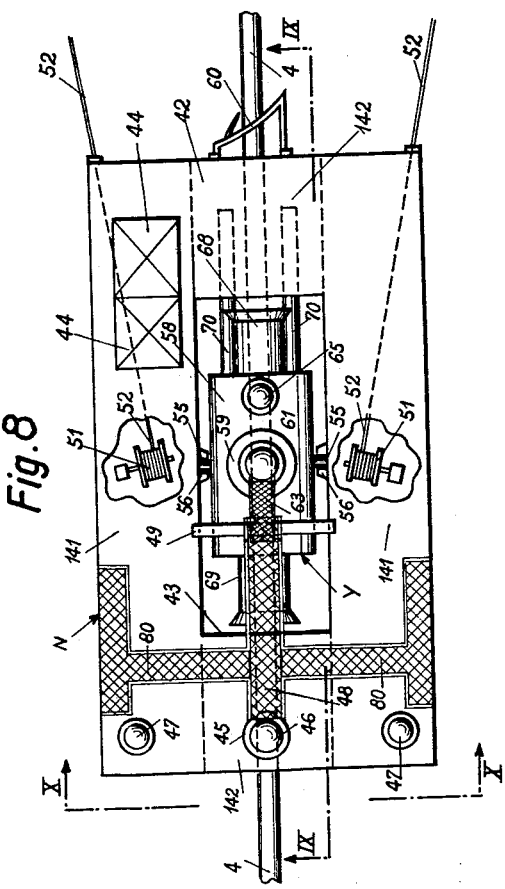
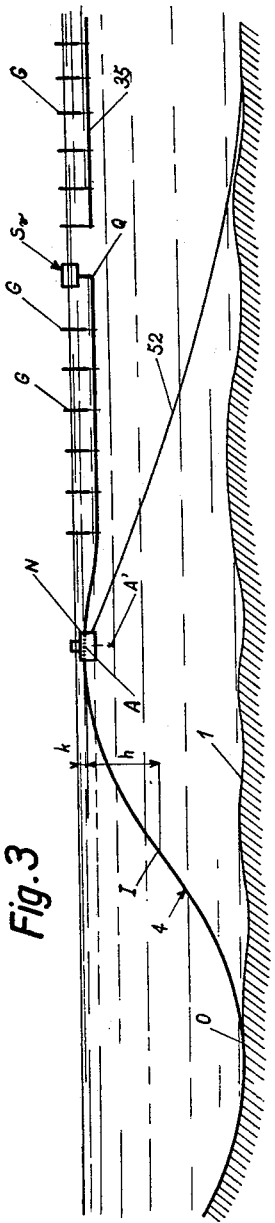
INVENTOR
GEORGES PERRET
By Irwin S. Thompson
ATTY.

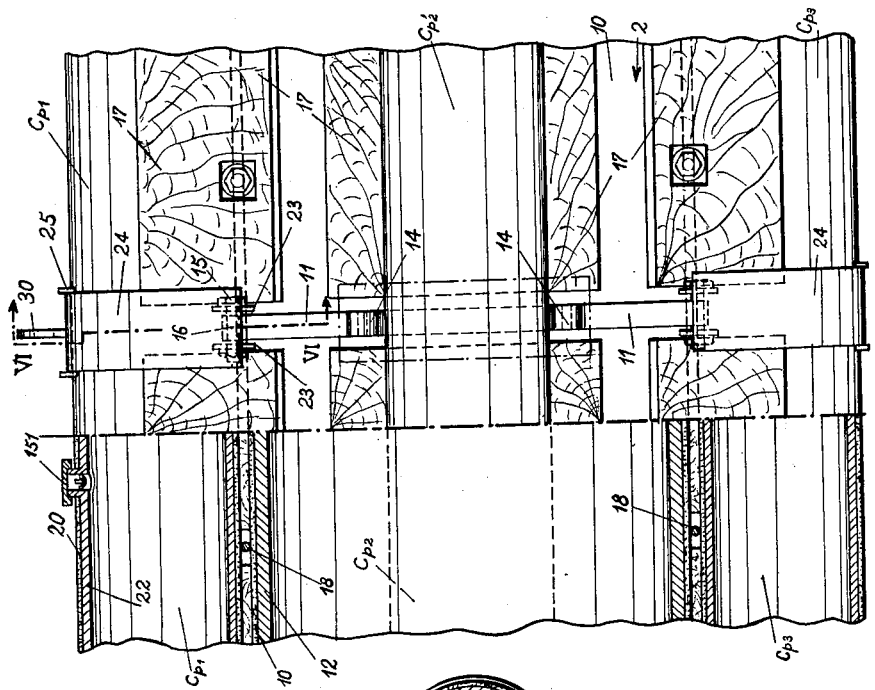
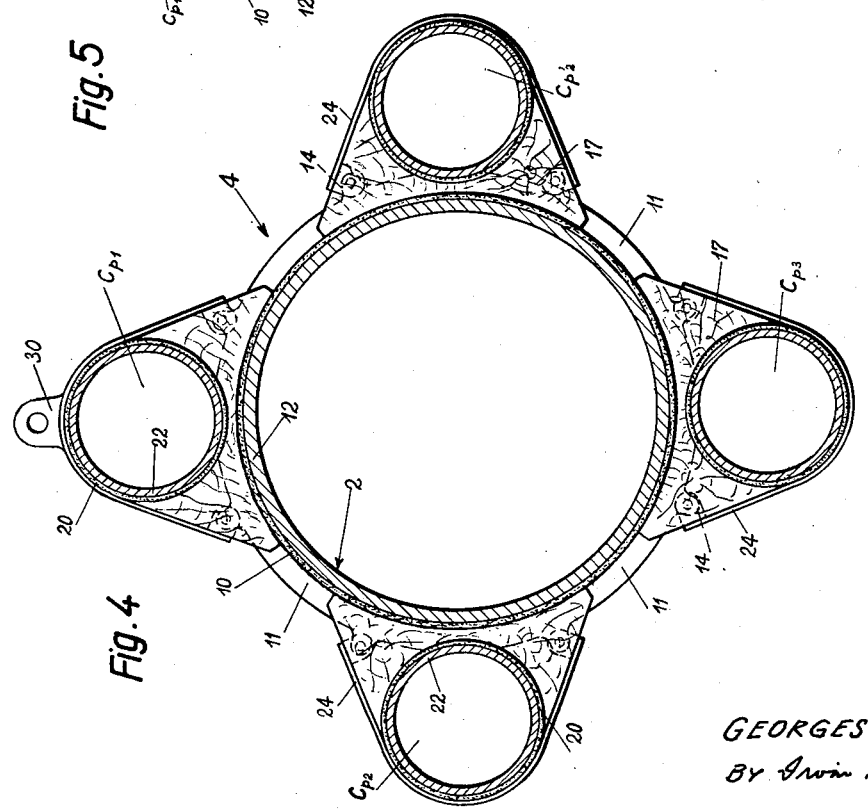

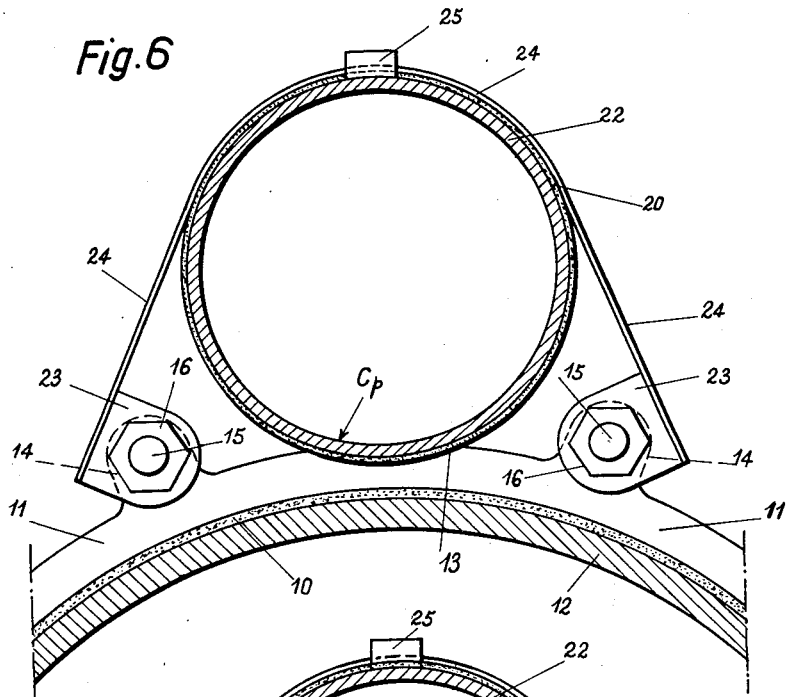
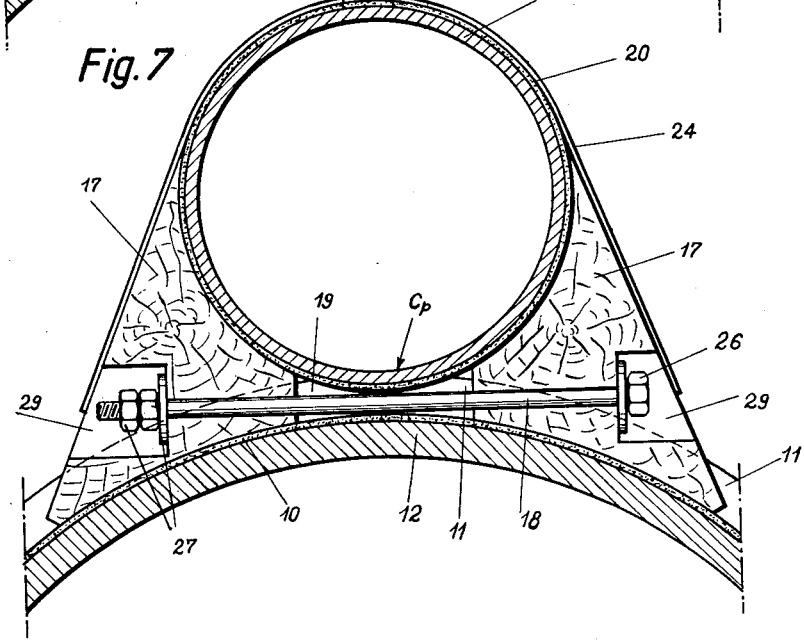

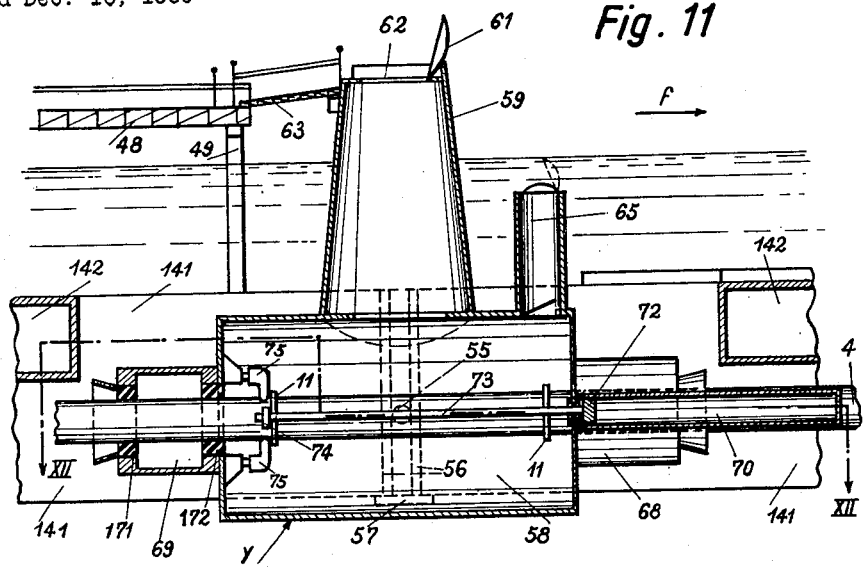
Fig. 11
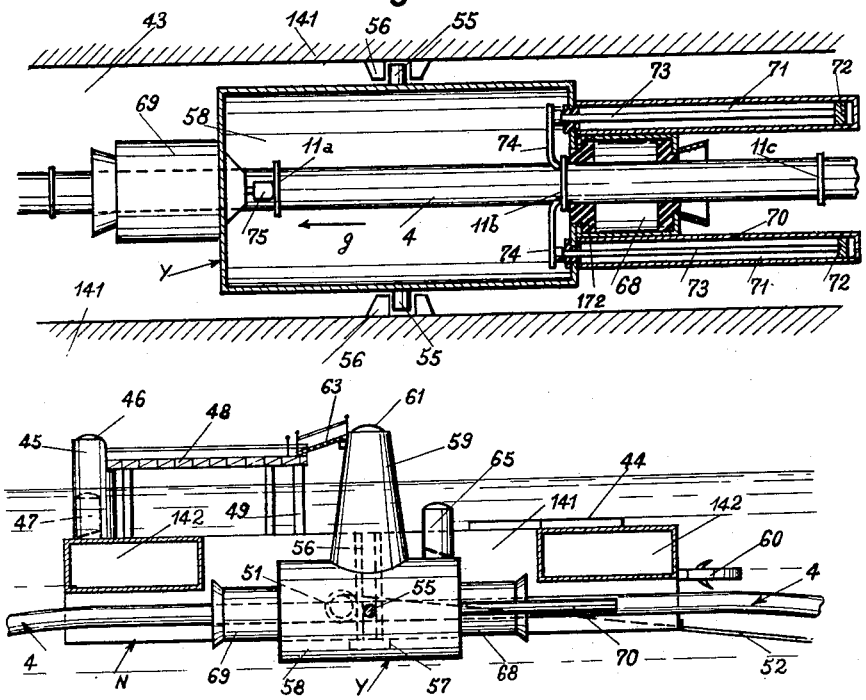
Fig. 12
Fig. 9

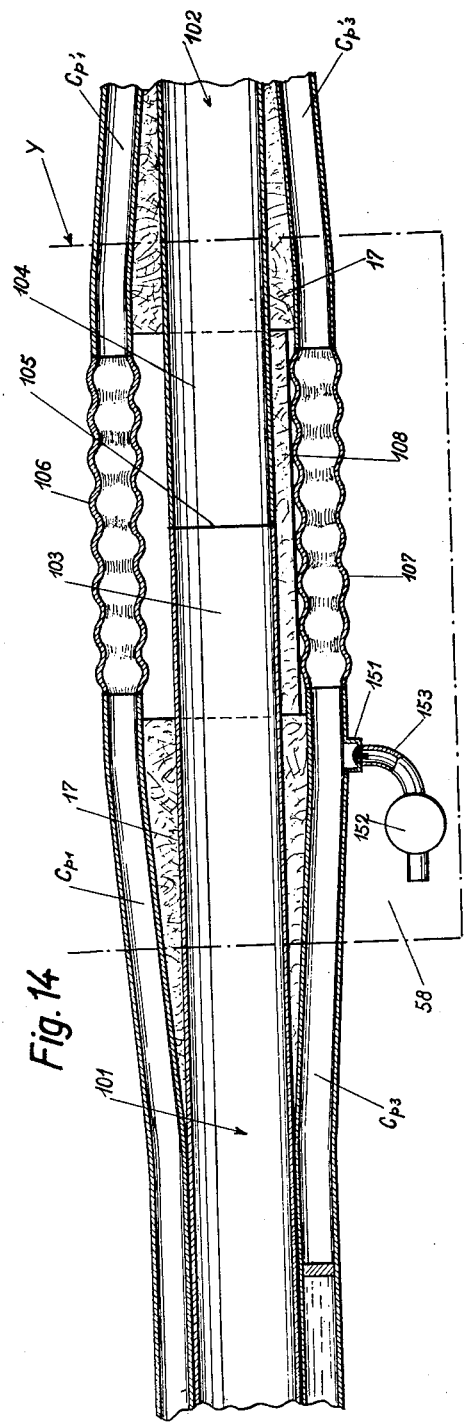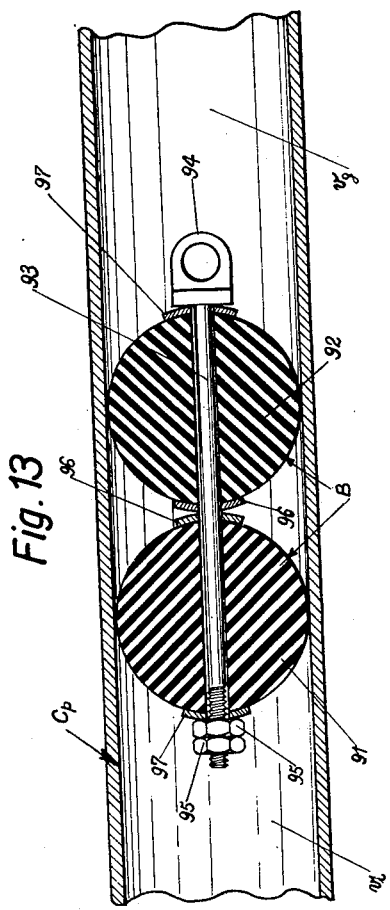

United States Patent Office 3,136,133
Patented June 9, 1964

3,136,133
LAYING DOWN OF IMMERSED PIPES
Georges Perret, 5 Square du Champ de Mars,
Paris, France
Filed Dec. 16, 1960, Ser. No. 76,179
Claims priority, application France Dec. 30, 1959
9 Claims. (Cl. 61—72.3)

The present invention relates to the laying down of immersed pipes on an immersed bottom, notably a submarine bed, said pipes being possibly used as pipe-lines for conveying various liquids, such as hydrocarbons.

The U.S. patent application Serial Number 65,795 filed by the same applicant and by Mr. François Fernique Nadau des Islets on October 28, 1960, and entitled "Improvements in or Relating to the Laying Down of Immersed Pipe-Lines," describes a process and apparatus especially adapted to effect, under controlled feed conditions, the laying down of a pipe on a bottom immersed at a substantial depth.

According to the aforesaid invention, the pipe section extending from the bottom to the vicinity of the surface is caused to assume a contour of equilibrium having a point of inflexion and a horizontal terminal portion of the upper branch, both by conferring to this branch a positive buoyancy and by subjecting it to a horizontal traction, that is, a horizontal tractive force, in the laying down direction, the location along the pipe of the positively buoyant branch and of the point of application of the traction being moreover shifted in the laying down direction, thereby ensuring a gradual setting of the pipe along the bottom.

In the aforesaid patent application, description is given of a practical manner of carrying out the above process, according to which the variation in the weight in water of the pipe is produced by means of floats which are secured to said pipe at the desired location, with the assistance of a floating workshop, the floats being subsequently unhooked at a distance, e.g. by means of an electric control system.

The improvements provided by the present invention relate to further means which may be utilized in the above process, in some cases in combination with the previously described means, and make it possible, in particular, to vary the apparent weight in water (i.e. the actual weight minus the Archimedean lifting or buoyant force) of the immersed pipe.

According to the invention, said improvements consist in adding to the main pipe at least one complementary pipe which is arranged along the former and filled partly with a light fluid such as air and partly with a dense fluid such as water, the variation in the apparent weight of the main pipe being produced by the displacement in the complementary pipe of the surface separating the liquid vein from the gaseous vein.

Preferably, the displacement of the partition surface between the liquid and gaseous veins in the additional pipe may be produced:

Either by pressure control in the gaseous vein;
Or by volume control in the liquid vein.

In an advantageous manner of carrying out the invention, provision is made for adding to the main pipe at least two complementary pipes having their liquid and pressure supplies controlled from two terminal stations, one located upstream, at the starting point of the multitubular line thus formed, and the other at the downstream end of said line.

In this case, one of the complementary pipes is filled with water from the upstream station to the vicinity of the point of inflexion provided on the pipe section connecting the pipe portion already set to the pipe portion waiting to be set, the liquid vein being maintained at that limit by an air counter-pressure of suitable value. Conversely, the second complementary pipe is filled with air from the upstream station to the vicinity of the horizontal end of said connecting pipe section, then filled with water in its downstream portion.

The laying down of the multitubular line may thus be remote-controlled by shifting the partition surfaces between the liquid and gaseous veins in the complementary pipes, which surfaces may be embodied by movable plugs.

The following description will show distinctly further particular features of the invention, directed especially to the manner in which the above process may be carried out and, as specific products of manufacture, to the equipment provided for this purpose.

In the accompanying drawings, given by way of non-restrictive examples:

FIG. 1 is a diagrammatical view of a multitubular line for the process according to the invention.

FIG. 2 is a diagrammatic elevational view of a multitubular line being laid down, FIGS. 2a and 2b being enlarged diagrams of the operating stations of FIG. 2.

FIG. 3 is an elevational explanatory diagram similar to FIG. 2.

FIG. 4 is a cross-sectional view of a specific embodiment of multitubular line.

FIG. 5 is the corresponding view in longitudinal partly sectional elevation.

FIG. 6 is an enlarged, partly sectional view taken along VI—VI of FIG. 5, the cradles being assumed to be withdrawn.

FIG. 7 is a view of the pipe partly in cross-section.

FIG. 8 is a plan view of the towing submersible.

FIG. 9 is a sectional view of the same, taken along IX—IX of FIG. 8.

FIG. 10 is a rear view of this submersible.

FIG. 11 is an elevational view on an enlarged scale, with axial section, of the sealed caisson of the same submersible.

FIG. 12 is a section along XII—XII of FIG. 11.

FIG. 13 is an elevational axial section of a movable plug.

FIG. 14 is an elevational axial section showing the joint between two pipe lengths.

Referring to the very diagrammatic view in FIG. 1, there is shown at 2 the steel pipe which is to be laid down on the immersed bottom (not shown), for example for conveying gaseous or liquid hydrocarbons. The pipe 2 has in water a specific buoyancy which depends upon its volume and wall thickness.

According to the present invention, the means provided for varying the buoyancy of pipe 2 consist in adding thereto at least one complementary pipe $Cp$ rigidly secured by means of fasteners 130. Arranged at two points 112, 113, spaced apart a substantial distance along pipe $Cp$ (e.g. at the opposite ends thereof) are devices adapted to control the inlet and outlet of fluid to and from the relevant portion of pipe $Cp$.

Said devices are diagrammatically shown at station 112 as consisting of a three-way valve 114 communicating with a pump 116 and with a drain valve 118. The same corresponding devices 115, 117, 119 are provided at station 113.

Further devices (not shown) adapted in particular to control the liquid flows and the pressure values may also be arranged at stations 112 and 113.

According to the invention, between the stations 112 and 113, one portion of the pipe $Cp$, such as 121, is fed with a light fluid (e.g. air), while the complementary portion 122 is filled with a dense fluid (such as water, saline solution or sludge). Thus, the portion 121 forms a gaseous vein $v_g$ and the portion 122 a liquid vein $v_l$, said two veins being separated by a sealed partition consisting of a movable plug B which is movable in either direction along pipe $Cp$ as a result of the differential pressure across its two faces.

According to the characteristics of pipe $Cp$, the apparent weight of portion 121 containing the vein $v_g$ may be positive, negative or zero. In particular, it is known to be negative when the thickness-to-radius ratio is lower than 0.0625. On the contrary, the apparent weight of portion 122 is always positive.

Under these conditions, the apparent weight of the multitubular line 4 consisting of the assembly of pipe 2 and pipe $Cp$ is markedly greater along portion 122 than along portion 121.

Since the multitubular line 4 is made of steel, it may be imparted in water, by resilient deformation, with a contour of equilibrium which is defined by a suitably adjusted filling of pipe $Cp$ together with the application thereto of a traction of predetermined direction and amplitude comprising a suitably chosen horizontal force T (FIG. 2).

If the distribution in space of the apparent weights along pipe $Cp$ is modified by a controlled action on veins $v_l$ or $v_g$, which eventually results in a displacement of plug B, a change may be produced in the conditions of hydrostatic equilibrium of the multitubular line 4, thereby causing the progression along the latter of the predetermined contour of equilibrium of this pipe between the bottom and surface. The multitubular line 4, and therefore the pipe 2, being laid down are thus caused to progress along the bottom.

Some examples of application of this process will be described hereinafter. The shifting of plug B and resulting change in the respective lengths of veins $v_l$, $v_g$ may be effected by remote-control from station 112 or station 113, or simultaneously from both stations, in various manners.

More particularly, pump 116 may feed a controlled amount of dense liquid to vein $v_l$, thus forcing back the light fluid in vein $v_g$ and shifting the plug B in the direction $f$. Reversely, pump 117 may compress the light fluid in portion 121, while the valve 118 drains a predetermined amount of liquid, thereby shifting the plug B in the direction $g$. In the latter case, and especially when the multitubular line 4 is not horizontal, since the vein $v_l$ is subjected to a hydrostatic pressure tending to move the plug B in the direction $f$, the movement of this plug may be controlled by application of a counterpressure through vein $v_g$.

As will be set forth, said means may be used either selectively, or simultaneously when several pipes $Cp$ are added to a main pipe, the plug movements then occurring in synchronism.

In both cases, the variation in the buoyancy may be effected conjointly by the fitting and removal at desired locations along the multitubular line of auxiliary floats, according to the provisions of the aforementioned patent application. The line may also be subjected to the action of removable ballasts.

However, the use of auxiliary floats or other releasable devices for modifying the buoyancy may be dispensed with, if use is made according to the present invention (FIG. 2) of two complementary pipes $Cp_1$, $Cp_2$ secured to pipe 2, rigid therewith and acting in opposition to each other for producing a controlled change in the buoyancy of the assembly in the direction of the laying down process.

In the diagram in FIG. 2, there is shown at 1 the bottom, assumed to be hilly, whereon the pipe 2 is to be immersed, and at 3 the water level.

On the other hand, there is shown at $S_m$ the upstream operating station which may, for example, be located on the bank, at the starting point of pipes 2, $Cp_1$ and $Cp_2$, and at $S_v$ a downstream floating station located in the same plane as the pipes and at any spacing from station $S_m$. The stations $S_m$ and $S_v$ are preferably equipped with devices for forcing the fluid into and out from the complementary pipes, together with any systems for volume metering and pressure control in concordance with the equipment provided for stations 112 and 113 of FIG. 1.

More precisely and as illustrated, at the upstream station $S_m$, the pipe $Cp_1$ leads to an air pump 31 while the open end 32 of the pipe $Cp_2$ is immersed in water. At the downstream station $S_v$, the pipe $Cp_1$ is provided with a volumetric pump 41 having its other opening dipped in water, while pipe $Cp_2$ is equipped with an air pump 42.

There is shown at $S_m$—O the already laid down portion of the multitubular line 4, at A—$S_v$ the portion awaiting to be laid down and at OA the pipe section connecting the two aforesaid portions, said section having in its intermediate portion a point of inflection I and its upper branch terminating horizontally at A in the vicinity of the surface 3. At or near the point A, a traction comprising a horizontal tractive force T of calibrated amplitude is exerted in the laying down direction $f$ with the assistance of a floating workshop N through which the line extends longitudinally. This floating workshop is provided with gripping means adapted to haul the line in the direction $f$, while the workshop hull is itself retained by towing cables 52 anchored on the downstream side and winding about suitable winches, devices for liquid and pressure supply being moreover provided on the workshop.

The contour of equilibrium of the pipe 2, having a point of inflexion I and a horizontal termination at A is also that of the complementary pipes $Cp_1$, $Cp_2$ running along the main pipe.

Further, H designates the depth of immersion adjacent to O and $h$ the depth of the point of inflexion I on pipe 2.

According to the present invention, provision is made to have, at a given instant, the plug $B_1$ in pipe $Cp_1$ located substantially at A, the downstream portion $S_v$—A of this pipe being filled with water and forming a liquid vein $v_{l1}$. On the contrary, the upstream portion $S_m$—A is filled with air and forms a vein $v_{g1}$, while pump 31 maintains a pressure sufficient to counter-balance the possible thrust from vein $v_{l1}$.

Reversely, pipe $Cp_2$ is filled with water from station $S_m$ to the point of inflexion I, the portion $S_m$—I forming a liquid vein $v_{l2}$, while the following portion $S_v$—I forms a gaseous vein $v_{g2}$. The plug $B_2$ is thus located adjacent to I.

The plug $B_2$ is retained in this position by counterbalancing the hydrostatic pressure of the water which enters through the opening 32 in the pipe $Cp_2$ and tends to fill it up to $S_v$. Said counter balancing is produced by an opposing air pressure supplied by the pump 42 under pressure control conditions. The value of this counter pressure is equal to that which would result from a water column having a height $h$.

By suitably selecting the natural buoyancies of pipes $Cp_1$, $Cp_2$, the bouyancy of the multitubular line consisting of pipes 2, $Cp_1$, $Cp_2$ may be caused to be negative from $S_m$ to I, positive from I to A where the gaseous veins $v_{g1}$, $v_{g2}$ are overlapping, and approximately zero from A to $S_v$.

Under these conditions and with traction T maintained, the curve OA is a natural and steady curve of equilibrium for the pipe assembly.

For effecting the laying down, air is compressed into pipe $Cp_1$ by means of the pump 31 of station $S_m$ and a predetermined quantity of water is allowed to escape through the pump 41 of station $S_v$, so that the plug $B_1$ is moved along $f$ up to $B'_1$.

Simultaneously, the point of application of the traction T is shifted from A to $A_1$, plumb with $B'_1$. Finally, the pressure in vein $v_{g2}$ of pipe $Cp_2$ is held at a constant value which may, for example, correspond to $h$.

Under these conditions, the pipe section OA will no longer be balanced and under the action of its immersed weight, the multitubular line will become deflected at A, so that it will settle down on the ground in the direction $f$ until point O reaches $O_1$, which point is such that $OO_1=AA_1$.

When the new position of equilibruim is reached, since the counterpressure in vein $v_{g2}$ remained unchanged, pump 42 having exhausted a controlled amount of air, the liquid vein $v_{l2}$ will have progressed in pipe $Cp_2$ by repelling plug $B_2$ which will finally reach $B'_2$, but remain at a constant depth $h$ with respect to the surface.

Preferably, the point I should be at a depth corresponding to a predetermined fraction of the total depth H. Now, it will be appreciated that this requirement may be met by causing the pressure in vein $v_{g2}$ to vary as H.

Since the pipes $Cp_1$, $Cp_2$ are of very great length relatively to their section, the movements of water in said pipes are damped to a high extent, so that the equilibrium of plugs $B_1$, $B_2$ is stable.

If the plugs $B_1$ or $B_2$ are to be moved back upstream, it suffices to feed water or air under pressure from station $S_v$ through the pipes $Cp_1$ or $Cp_2$.

It will thus be seen that the laying down of the pipe may be controlled from two stations $S_m$, $S_v$ spaced any distance from the laying down point. Besides, said stations may be operated by remote control from the floating workshop located at A, while moreover some of the operatins involved, in particular the supply of compressed air to pipes $Cp_2$ may be effected from said workshop.

For carrying out the invention in a practical and advantageous manner, the following requirements may be met: assuming P' is the weight of the amount of water contained in pipe $Cp_1$ along a one-metre distance, provision is made for the pipe $Cp_2$ to have a weight per metre of 2P' and for the multitubular assembly of pipe 2 and pipes $Cp_1$, $Cp_2$ assumed to be empty of water to have a linear weight (or buoyancy) of $-$P'. (Practically, P' may be 10 or 15% of the empty linear weight of the main pipe.)

The apparent linear weight of the multitubular line 4 is then +P' from $S_m$ to I, $-$P' from I to A and zero from A to $S_v$.

If 2L designates the distance of immersion (Oa), the value of traction T is on the other hand:

$$T=P'L^2/2h$$

Under these conditions, the curve of equilibrium of section OA consists substantially, as set forth in the aforementioned patent application, of two parabolas having their apexes at O and A and merging at I, middle-point of OA.

Preferably, the value of the horizontal tractive force T, which is a tensile force, is only charged to vary the distance of immersion for a given depth (or to comply with the variations in depth). If the preferred curve of equilibrium for section OA, characterized by the horizontal position of the line at A, is to be maintained, then the air counterpressure in vein $v_{g2}$ should be varied. An increase in said pressure, with resultant lowering of plug $B_2$, will cause the pipe 2 to ascend adjacent to and upsteam of A. A drop in said pressure will have the reverse effect.

As is the case for the prior patent application previously cited, the arrangement which has just been described is particularly adapted for a long-distance crossing, the multitubular line 4 being constructed in the harbour in the form of great lengths which are fastened to floats and tugged along to point A.

The maximum laying down depth is dependent upon the necessity for the empty pipes to have both sufficient compression and buckling strength.

Obviously, the process and devices which have just been described are liable to various modifications. Thus, the provision of a plug in pipe $Cp_2$ is optional. On the other hand, several pipes of the same type as $Cp_1$ and several others similar to $Cp_2$ may be added to the main pipe 2. Provision may also be made for using the complementary pipes $Cp_1$, $Cp_2$ subsequent to the laying down, as ballasts for the main pipe by filling them with a suitable dense liquid with a view to counteract the possible action of currents. In some cases, this ballasting may advantageously be limited during the fitting to the portion $S_m$—O.

According to another particular feature of the invention (FIG. 3) and especially when at least two pipes of each type $Cp_1$ and $Cp_2$ are used, since no float handling is required, provision is made according to the invention for maintaining the junction point A at a distance from the surface (for example at a 5-metre depth), thereby avoiding the action of sea swells on the tubular line.

Provision is further made, to eliminate any risk of losing the pipe in case of a storm, for designing the floating workshop N normally positioned at A as a submersible. Under these conditions, should a storm arise, then point A could be brought down to A' at a 15-metre depth for example.

In this case, if $h$ designates the vertical distance between points A and I, the air counterpressure in pipe $Cp_2$ should correspond to $h+k$ where $k$ designates the depth of the junction point A.

In practically carrying out the invention, the lengths awaiting to be laid down are maintained horizontally by floats G at a depth of $-12$ metres, for example. To allow for an easy coupling of these lengths with the pipe section OA, it may be advantageous to shift the plug $B_1$ downstream by suitably adjusting the drain of pipe $Cp_1$ from station $S_v$, which is supposed to be at Q, downstream of A. As the laying down proceeds, the floating workshop located at A is moved by towing closer to the ship anchored at Q which carries the station $S_v$.

An example of practical design of an equipment according to the above provisions will now be described with reference to FIGS. 4 to 13 in the case of a long-distance crossing (100 to 200 kilometres) with a maximum depth of the order of 400 metres and assuming there is no current of appreciable strength.

STRUCTURE AND ASSEMBLY OF THE MULTI-TUBULAR LINE 4

In this example, in addition to the main pipe 2, four identical complementary pipes are provided and arranged about the former, 90° apart from each other: one pipe $Cp_1$ along the upmost generatrix, two lateral pipes $Cp_2$, $Cp'_2$ and a fourth pipe $Cp_3$ along the lowest generatrix, this serving a specific purpose at time of the coupling of the great lengths, as will be explained hereinafter.

This symmetrical arrangement of the complementary pipes makes it possible for the assembly to remain stable at the various laying down stages without rotating about its axis.

The pipe 2 (FIG. 4) consists of a steel tube 12 and is coated with a protecting layer 10, e.g. of bitumen. The pipe 2 is assembled in the harbour by end to end welding of elements 10 to 12 metres long. Every five metres, the pipe 2 is hooped with a collar 11 of rounded cross-section.

The complementary pipes are similarly made of steel tubes 22 coated with a protective layer 20.

The tubes 22 are caused to bear against notches 13 in the collars 11 on either side of which (FIG. 6) are formed flanges 14 engaged on both sides by the lugs 23 of half-collars 24 externally surrounding each pipe $Cp$ and extending through clevises 25 welded to the pipe 22. The half-collars 24 are rigidly secured to the collar 11 by means of bolts 15 and nuts 16.

The attachment is completed by means of wooden supporting beds or cradles 17 of prismatic and double-concave configuration which are arranged between two collars 11 and follow both the contours of pipe 2 and pipe $Cp$, partly embracing the latter. At regular intervals, the cradles 17 are crossed through (FIG. 7) by tie-rods 18 extending between the pipe 2 and the relevant pipe $Cp$, through a passage 19 formed in the cradle.

The head 26 and securing nuts 27 of each tie-rod 18 are housed in recesses 29 formed to this end in the cradles 17.

Also at regular intervals (e.g. every 50 metres) along the complementary pipes $Cp_1$, $Cp_2$, valve hoods 151 accessible from outside (FIG. 5) are provided for a purpose to be set forth.

Finally, fastening devices such as rings 30 are provided every 40 metres and welded onto a collar on pipe $Cp_1$, said collar being connected to pipe 2 by reinforced securing means.

The rings 30 are intended for hooking the tubular bundle to the conveyor floats G of the acidimeter type, described in the above patent application. By means of these floats it is possible to convey to the laying down point a long pre-assembled length 35 (FIG. 3) 1,000 to 2,000 metres long for example, having a substantially zero apparent weight, which is driven along horizontally at a depth of 12 metres for example (FIG. 3).

By way of example, the following dimensional characteristics may be adopted:

Main Pipe 2 and Fittings

| | | |
|---|---|---|
| Internal radius | mm | 205 |
| Metal thickness | mm | 12 |
| Empty weight per linear metre of bare pipe | kg | 127.20 |
| Mean total weight in air per linear metre (including the collars and bitumen layer) | kg | 139.15 |
| Archimedean thrust in sea-water | kg | 157.95 |
| Buoyancy in sea-water | kg | 18.80 |

Complementary Pipes Cp

For each pipe, in kilograms per linear metre:

| | |
|---|---|
| Weight of the internal volume of sea-water | 15.4 |
| Bare empty weight | 14.5 |
| Total weight in air | 15.9 |
| Archimedean thrust | 18.9 |
| Buoyancy in sea-water | 3.0 |

Apparent Weight of the Assembly in Sea-Water

[In kg./linear metre]
[Density assumed to be 1 for sea-water]

| | |
|---|---|
| 1 filled pipe (such as $Cp_3$); 3 empty pipes ($Cp_1$, $Cp_2$, $Cp'_2$) | −15.4 |
| 2 filled pipes ($Cp_1$, $Cp_3$) | 0 |
| 3 filled pipes ($Cp_2$, $Cp'_2$, $Cp_3$); 1 empty pipe ($Cp_1$) | +15.4 |
| 4 filled pipes (fitted line) | +30.8 |

Point A being at a depth $k=5$ m., the pressure at A in pipes $Cp_2$, $Cp'_2$ is maintained at the value $h+5$, $h$ being such that the depth H of point O will be $2h+5$.

Since in the tubular nest being laid down, the filling conditions are as follows:

| | |
|---|---|
| Pipe $Cp_1$ | Filled from $S_v$ to $B_1$, adjacent to A. |
| Pipes $Cp_2$, $Cp'_2$ | Filled from $S_m$ to I, empty from I to $S_v$. |
| Pipe $Cp_3$ | Filled along its whole length. |

The overall apparent weight is as follows:

| | Kg. |
|---|---|
| From $S_m$ to O | +15.4 |
| From O to I | +15.4 |
| From I to A | −15.4 |
| From A to $B_1$ | −15.4 |
| From $B_1$ to $S_v$ | 0 |

Once the multitubular line is definitely laid down, the four complementary pipes are filled with water along their whole length and the apparent weight becomes +30.8 kg. all along the line.

To achieve laying down, provision may be made for installing the upstream station $S_m$ on the mainland, while the downstream station $S_v$ is mounted at Q on a ship or tugged pontoon. Finally, in the example illustrated where point A is to be at a 5-metre depth, the operations at this point are carried on in an immersed caisson Y, in turn mounted on a submersible tower ship N. These units will be described presently.

MOVABLE PLUGS B

FIG. 13 illustrates one embodiment of a movable plug B capable of moving along the pipes Cp under the action of a differential pressure, while acting as a fluid-tight partition without any risk of jamming, irrespective of the possible unevenness of the internal face of the associated pipe.

This plug comprises two tangential spheres 91, 92 of flexible, resilient anti-abrasive material. These spheres are rigidly interconnected by a threaded rod 93 extending diametrically therethrough. A head 94 and nuts 95 are adapted to squeeze the spheres against each other by bearing against metal shields 96 while further shields 97, registering on the adjacent areas of the two spheres, prevent the latter from being impaired by frictional engagement.

SUBMERSIBLE TOWER SHIP N (FIGS. 8, 9, 10)

The main function of this ships to act as a support for caisson Y and to transmit thereto the traction resulting from the progression by towing, while affording the various supplies for the work to be carried on therein (compressed air, water, electric current, implements etc.).

The hull of the submersible N consists essentially, in the example illustrated, of two pontoons 141 interconnected by two transverse passages 142. Mounted in the central well 43 is the caisson Y.

The pontoons 141 are provided with a ballasting system with filling and draining devices (not shown) of any known type, adapted to ensure immersion of the pontoons at a mean depth $k'=4$ m. (normal working depth) or to submerge the submersible assembly to a depth of 12 to 20 m., approximately, in the case of a storm. This system also permits of bringing the deck of the submersible to the surface by draining the ballasts.

The submersible hull comprises on the other hand various access or evacuation devices such as sealing panels 44, an access-house 45 provided with a sealing device 46 and two emergency locks 47 for the staff.

The access-house 45 opens onto a fixed raised bridge 48 carried by an awning 49 and communicating with boarding and handling bridges 80. These bridges are above the surface of the water when the pontoons 141 are immersed at the mean depth of 4 m., thus giving access to the caisson Y.

Located inside the pontoons 141 are, among other things, the towing winches 51 having wound thereabout the towing cables 52 which enter the pontoons through fluid-tight passages 53. These cables are anchored a substantial distance downstream of the submersible N.

Finally, provided in the front portion of the submersible N is a device 60 for automatic removal of the floats G supporting the line. This device may, for example, be effective to cut the fastening ropes and guide the tubular floats G to a collection place, for example along the submersible.

The rig and internal equipment of the ship N, which may vary within broad limits, will not be further described in this diagrammatic illustration.

CAISSON Y (FIGS. 11 AND 12)

The caisson Y, which is arranged in the well 43, is connected to the submersible by means of a pair of trunnions 55 arranged along its transverse axis and slidable in slideways 56 secured to the pontoons 141. Provided at the bottom of slideways 56 are retractable abutments 57 normally preventing the trunnions 55 from being disengaged by gravity from the slideways 56. The internal chamber 58 of caisson Y communicates with outside through a tower 59 fitted at its upper portion with a sealing device 61. When the pontoons 141 are immersed to the mean working depth of 4 m., the chamber 58 is at a mean depth of 5 m. and the platform 62 of tower 59 lies above the surface. The sealing device 61 is open to ventilate chamber 58. Platform 62 is connected to the fixed bridge 48 through a movable bridge 63 affording an access irrespective of the possible vertical oscillation and roll movements of the caisson Y with respect to the submersible N. An emergency lock 65, normally immersed and closed, is provided parallel to the tower 59 for the evacuation of the staff.

The equipment of caisson Y for handling pipe 2 together with its complementary pipes $Cp$ which extend longitudinally therethrough is similar to that described in the aforesaid prior patent application and will be but briefly restated.

The caisson Y is so equipped as to allow the work on the pipe-line to be carried on in the dry.

To this end, the central chamber 58 has extensions in the form of a front chamber 68 and a rear chamber 69 acting as locks and providing an inlet and an outlet to and from chamber 58 for the pipe-line 4. The chambers 68 and 69 are fitted with flexible and compressible packings 171 and 172 having a contour adapted to follow exactly that of the multitubular line such, for example, as shown on FIG. 4. This lock-crossing is facilitated by the prismatic configuration of the cradles 17.

The chambers 68 and 69 may be put under overpressure to avoid any accidental penetration of water, particularly when the caisson Y is immersed with the submersible N to a 15-metre depth, for example in the case of a storm. For this purpose, a connection through flexible cables and hoses may be advantageously provided between the submersible N and the caisson Y.

As in the aforesaid patent application, chamber 68 is provided on its side with the cylinders 70 of pulling jacks 71 whereof the pistons are shown at 72 and the rods at 73, while at 74 there are shown the nippers pivoted on the rods 73. Said nippers are intended to engage the collars 11 of pipe 2 within the space existing between two adjacent pipes $Cp$ so as to permit the application of the traction T to the pipe line at movable point A.

On the same side as chamber 69 and before the inlet theerto, chamber 58 is provided with a set of retractable abutments 75 which may also engage the collars 11 on pipe 2.

The operation of the tower submersible N and caisson Y does not differ essentially from that set forth in the aforesaid patent application S.N. 65,795 with reference to the floating workshop. As described therein, the pontoons 141 are immersed at a mean depth of 4 metres and the caisson Y at 5 metres, the bridge 63 and bridge 48 lying at the surface, thereby ensuring communication between the two submersible units N and Y and allowing the work to be achieved in connection with the external atmosphere.

To achieve the laying down of the pipe, the nippers 74 of the jacks 71 are caused to engage a collar $11b$ and the cylinders 70 of these jacks are fed with an air pressure corresponding to the traction T. At the same time, the abutments 75 are retracted to permit the free passage, in the direction $g$ with respect to the caisson, of the collar $11a$. Since on the other hand the winches 51 are operating, winding the towing cables 52, the submersible N will progress in the direction $f$ so that the point of application of the traction T will move along the pipe line. When the collar $11b$ has come to engage the abutments 75, which resumed their locking position after the passage of collar $11a$, the nippers 74 of jacks 71 are cleared off and brought back into the vicinity of chamber 68 to retain the next collar $11c$.

During this operation, the pipe is retained by the abutments 75 bearing against collar $11b$ and the traction or tractive force T is applied by means of the winches 51. The same sequence occurs for each collar all along any great length.

The travel of caisson Y along the pipe line 4 is used for restoring the pressure in pipes $Cp_2$, $Cp'_2$ every time a valve hood 151 enters chamber 58. The compressed air supply devices carried by the ship Q are only used in the case of a failure of the corresponding devices on caisson Y.

The handling for coupling two great lengths of pipe will now be described with reference to FIG. 14.

The end 101 of the already fitted length being enclosed in chamber 58 of the caisson Y, the next length 102 is fed according to the technique described in the prior patent application providing for the temporary attachment on the new length 102 of a temporary tubular element facilitating the fluid-tight insertion of pipe length 102 into chamber 58.

Preferably, in the vicinity of the end 103 of length 101 and of the end 104 of length 102, the cradles 17 of the pipes $Cp$ are of increasing cross-section so as to diverge about pipe 2 within the limits consistent with the opening and compressibility of the lock packings.

It becomes thus possible to butt-weld at 105 the two ends 103, 104 of pipe 2.

Provisions are moreover made to effect interconnection between the complementary pipes and to maintain these pipes under the required pressure during coupling.

For this purpose, caisson Y, immersed to a depth of 5 metres, is subjected to an air pressure slightly higher than that corresponding to the water pressure at 5 meters depth, the various valves being closed to this end.

Under these conditions, pipe $Cp_1$ whose plug $B_1$ was previously forced back to the downstream side, may readily be coupled through a corrugated tube 106 with the homologous pipe of the new length, the divergent arrangement of the cradles 17 facilitating the welding steps.

Pipe $Cp_3$, which is maintained at a water pressure equal to the air pressure in chamber 58, is connected through a valve hood 151 and a hose 153 to a compressor 152 which raises its pressure to a value somewhat higher than that in chamber 58. The water in pipe $Cp_3$ is thus forced upstream and the pipe may therefore be opened without inconvenience and coupled through the corrugated tube 107 to the pipe $Cp'_3$ of the new length 102. The corrugations in tubes 106, 107 act to compensate the shrinkages which may appear in the tubular assembly as a consequence of the various welding steps. Once these corrugated tubes are fitted, they may be attached to pipe 2 by any known means, such for example as wedges 108 and collars (not shown).

The coupling of pipes $Cp_2$, $Cp'_2$ is more difficult due to the necessity of maintaining same at an air pressure of $h+5$, this making it impossible to open them in chamber 58. As a first solution, this coupling may be effected by means of a set of branched off ducts provided with suitable valve means.

A second advantageous solution provided by the invention consists in achieving this coupling by effecting a temporary exchange of functions between pipe $Cp_3$ and one of the pipes $Cp_2$, $Cp'_2$. For this purpose, the pipe $Cp_3$ is subjected by means of the compressor 152 to the pressure $h+5$, while the pressure in pipe $Cp_2$ is simultaneously dropped to a value close to that of the air pressure in the caisson. The pipe $Cp_2$ may then be coupled to the new length as previously done for pipe $Cp_3$. A further exchange of functions is then effected for example between pipe $Cp_3$ and pipe $Cp'_2$.

During these operations, the exchange of functions between pipes $Cp_3$ and $Cp_2$ (or $Cp'_2$) modifies the conditions of equilibrium of pipe 2, which will then have between points O and A a contour consisting no longer of a double parabola, but of segments pertaining to different curves merging with one another. Calculation shows that these modifications do not affect the pipe line, provided that in each case the tensile force T is brought to the desired value which, on the worst case, may be by 25% higher than the nominal value for the laying down process.

Obviously, the various provisions which have just been described are only intended to prove the practical possibility of carrying out the process according to the invention, but without implying any limitation thereof. In particular, with a multitubular line, the point A may also be kept at the surface, as provided in the aforesaid prior patent application.

What I claim is:

1. A process for lying down a main hollow steel pipe to be used as pipe-line on an immersed bottom from one shore line to another shore line, by imparting to said pipe a resilient deformation on a section thereof comprised between the bottom and the vicinity of the water surface and joining the pipe portion already laid down to the pipe portion awaiting to be laid which is maintained at the vicinity of the water surface in a position substantially parallel thereto, said deformation being such that said pipe section has an inflection point between the bottom and the vicinity of the water surface and an upper branch with a horizontal termination, said process consisting in adjoining to said main pipe at least one complementary pipe stretching all along said main pipe and attached thereto by a rigid assembly, in filling said complementary pipe with a liquid from said one shore line down to a point at a predetermined level on said pipe section, in exerting on side pipes assembly a traction in the direction thereof and towards said other shore line, said traction being applied to said pipes assembly at said termination of said pipe section upper branch, in substantially continuously displacing said traction along said pipes assembly in the direction extending from the one shore line to the other shore line, in simultaneously controlling the level of the liquid filling in said complementary pipe and in adjusting the values of said filling level and traction so that the pipes assemby is kept substantially horizontal at the point where said traction is applied thereto.

2. A process according to claim 1 wherein said complementary pipe is filled with a gas under pressure placed between the liquid level in said pipe and the termination of said pipe at said other shore line, and wherein said liquid level is controlled by controlling said pressure of said gas.

3. A process according to claim 1 and consisting in adjoining to said main pipe two complementary pipes attached thereto and connected to a first operating station located on said one shore line and to a second operating station located on said pipe in the direction of said other shore line to said pipe section comprised between the bottom and the vicinity of the water surface, in filling with a liquid one of said complementary pipes from said one station to a point of said pipe section at a predetermined level, depending upon the depth at the point where said pipe leaves said bottom, in controlling said level by a gas counterpressure from said second operating station, in filling said second complementary pipe with a gas from said one station down to said point on said pipe assembly where said horizontal traction is exerted thereto, the part of said second complementary pipe comprised between said point and said second operating station being filled with a liquid, and in controlling said filling from said second station, in accordance with the displacement along said pipes of said point in the direction of said other shore line where said traction is applied to said assembly.

4. A process according to claim 1 consisting in adjoining to said main pipe two complementary pipes attached thereto and extending from a first operating station on said pipe located in the direction of said one shore line of said pipe section joining the pipe portion already laid down on the bottom to the pipe portion awaiting to be laid down at the vicinity of the water surface, to a second station located on said pipe in the direction of said other shore line to said pipe joining section, in forcing in a direction from said first operating station towards said second station a liquid into one of said complementary pipes down to a point at a predetermined level of said pipe section, in controlling said level by a gaseous counter-pressure from said second station, in filling the other one of said complementary pipes with a liquid, thereafter in forcing into said latter complementary pipe previously filled with a gas under pressure from said first operating station, and in controlling the liquid discharge from said last-cited complementary pipe at said second station, the filling of said both complementary pipes being such that the total weight in water of said pipe section is substantially zero.

5. A process according to claim 1 and consisting in locating at said termination of said pipe section upper branch a submersible ship having a sealed caisson pivotably mounted thereon, in maintaining said caisson in the vicinity of the water surface, in tightly passing said main pipe and complementary pipe through said sealed caisson, in towing said submersible ship in the direction of said other shore line along the pipe portion awaiting to be laid down at the vicinity of the surface, and in steadily imparting a traction of predetermined valve to said main pipe in the direction of said other shore line during the displacement of said sealed caisson relatively thereto.

6. A process according to claim 1 for the connection of a pipe section being laid down to a pipe length awaiting to be laid down, wherein three complementary pipes are secured all along said main pipe, said process consisting in filling one of said pipes with a liquid along substantially the whole of its length from an operating station located in the direction of said one shore line toward an operating station located in the direction of said other shore line, in subjecting at the time of coupling of two successive lengths of said main pipe said last-cited complementary pipe to an emptying gaseous counterpressure from said last-mentioned operating station, so as to push the liquid contained therein in the direction of said one shore line down to a predetermined level of the joining pipe section, in fully filling with liquid that one of said complementary pipes being otherwise filled up to said predetermined level, and in connecting substantially under atmospheric pressure said last-cited complementary pipe to the corresponding complementary pipe of the subsequent length of pipe awaiting to be laid down.

7. A process for laying down a main hollow steel pipe to be used as a pipe line on an immersed bottom from one shore line to another shore line by imparting to said pipe a resilient deformation on a section thereof comprised between the bottom and the vicinity of the surface and joining the pipe portion already laid down to the pipe portion awaiting to be laid which is kept at the vicinity of the water surface and positioned substantially parallel thereto, said process consisting in adjoining to said main pipe two complementary pipes stretching all along said main pipe and attached thereto by a rigid assembly, said complementary pipes extending from a first operating station on said one shore line to a second operating station in the direction of said other shore line to said joining pipe section, in forcing in a direction from said first operating station towards said second station a liquid into one of said complementary pipes and in controlling by a gaseous counter-pressure from said second operating station the liquid level within said pipe section, so that said level is kept at a predetermined depth depending upon the depth of the point where said pipe leaves said bottom, in filling the other one of said complementary pipes with a liquid, thereafter in forcing into said latter complementary pipe previously filled a gas under pressure from said first station, in controlling at said second operating station the volume of liquid discharged from said last-cited pipe, in applying on said pipe assembly a horizontal traction in the direction of said other shore line at the upper point of said pipe joining section, in controlling said traction so that the pipe is kept substantially horizontal at this point and in substantially continuously displacing said application point of said traction so as to displace all along said pipe said joining pipe section.

8. An arrangement for laying down a main hollow steel pipe to be used as a pipe-line on an immersed bottom from one shore line to another shore line, said arrangement comprising at least two complementary pipes rigidly attached to said main pipe, an operating station on said one shore line at the termination of said pipes, means at said station for filling one of said complementary pipes with water and the other one with gas, a section of said pipes having a resilient deformation, said section joining the pipe portion already laid down to the pipe portion awaiting to be laid down, said deformed pipe section having an inflection point between said pipe portions and an upper branch with a horizontal termination, floating means on said pipe portion awaiting to be laid down for keeping the same at the vicinity of the water surface above said immersed bottom, towing means movably mounted on said pipes assembly at said pipe section upper branch horizontal termination for displacement along said pipe towards said other shore line, means energized by said towing means for imparting to said pipes assembly a horizontal traction in a direction of said other shore line, and an operating station mounted on said pipes assembly in the direction of said other shore line and beyond said towing means and means in said latter station for controlling a gaseous pressure within said first complementary pipe and for controlling a liquid flow for said second complementary pipe.

9. An arrangement according to claim 8 wherein said towing means comprise a submersible ship consisting of two parallel pontoons having a well therebetween and a caisson housed within said well slidably and pivotally mounted on said pontoons, means for water-ballasting said pontoons, means for towing said ship, said towing means comprising towing winches mounted on said pontoons, means on said caisson for tightly accommodating said pipes assembly, means borne by said caisson for drawing said pipes assembly, said drawing means comprising jacks fitted on said caisson and means for removably securing said jacks to said pipes assembly while the latter passes through said caisson.

References Cited in the file of this patent
UNITED STATES PATENTS 2,871,665 Brandt _____ Feb. 3, 1959
2,910,835 Timothy _____ Nov. 3, 1959

OTHER REFERENCES

Oil and Gas Journal, Nov. 4, 1957, pp. 154, 155.